United States Patent [19]

Rothenbacher et al.

[11] Patent Number: 4,503,626

[45] Date of Patent: Mar. 12, 1985

[54] ARRANGEMENT FOR MANUFACTURING OR TREATING WEB MATERIAL

[75] Inventors: Peter Rothenbacher; Erich Vomhoff, both of Koenigsbronn, Fed. Rep. of Germany

[73] Assignee: Schwabische Hüttenwerke GmbH, Aalen-Wasseralfingen, Fed. Rep. of Germany

[21] Appl. No.: 433,805

[22] Filed: Oct. 8, 1982

[30] Foreign Application Priority Data

Dec. 10, 1981 [DE] Fed. Rep. of Germany ....... 3140425

[51] Int. Cl.³ ............................................. F26B 13/08
[52] U.S. Cl. ...................................... 34/110; 34/119; 34/124
[58] Field of Search ........................ 34/119, 124, 110; 165/89, 90

[56] References Cited

U.S. PATENT DOCUMENTS 3,988,201  10/1976  Smith, Jr. ............................... 34/119
4,261,112   4/1981  Apitz ...................................... 34/119
4,379,369   4/1983  Schiel ..................................... 34/119

Primary Examiner—Larry I. Schwartz
Attorney, Agent, or Firm—Michael J. Striker

[57] ABSTRACT

An arrangement for manufacturing or treating a web material comprises a rotary hollow roll having a hollow jacket which has an axis, a central region around which a web material moves, and two axial end regions which are free from the web material, two bearing pins each supporting said jacket in a respective one of said end regions, at least one of which bearing pins has a passage for a heat-carrying fluid, a displacing member located inside the jacket and extending concentrically to and over the greater part of the jacket so as to form an annular gap between the displacing member and the jacket and communicating with the passage for heat-carrying fluid to supply the latter, and a heat-insulating element arranged at an inner side of each of the end regions of the jacket for reducing heat transfer from the heat-carrying fluid to the jacket.

13 Claims, 6 Drawing Figures

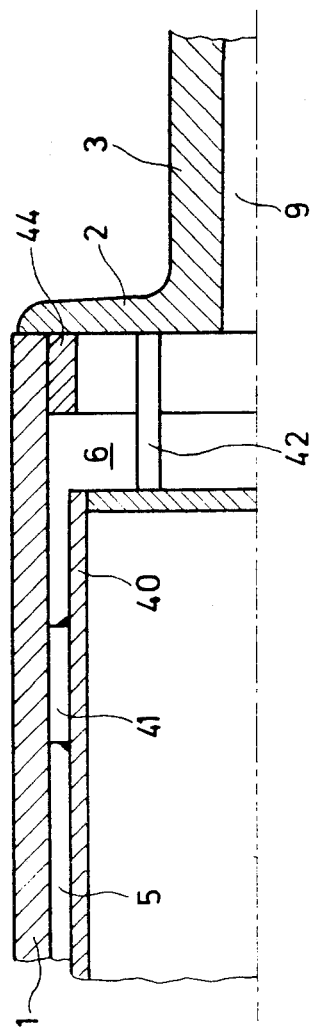
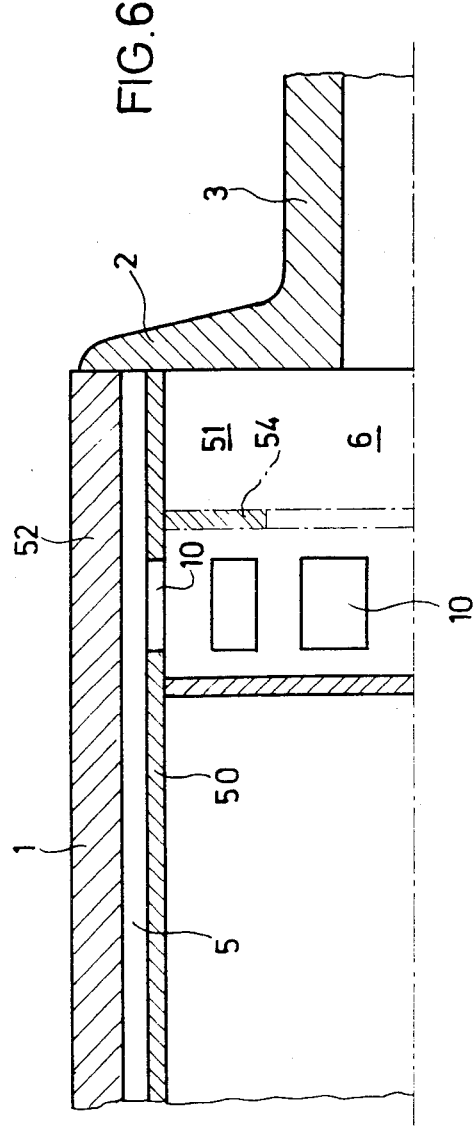

[4,503,626]

ARRANGEMENT FOR MANUFACTURING OR TREATING WEB MATERIAL

BACKGROUND OF THE INVENTION

The present invention relates to an arrangement for manufacturing or treating a web material. More particularly, it relates to an arrangement for manufacturing or treating a web material which has a hollow roll, two bearing pins of which one has a conduit for a heat-carrying fluid, and a displacement member arranged inside the hollow roll and extending for a greater part of the latter so as to form an annular gap between the displacement member and the roll jacket for passing the heat-carrying fluid.

In the above-described arrangement, treating of a web material, for example a synthetic plastic material, a bonded fabric or above all paper, can be performed by heating or cooling, depending upon the material. For this purpose the heat carrier is supplied through the annular gap between the displacement member and the roll jacket. By controlling the quantity or the temperature of the heat carrier, or both, the desired heat transfer condition between the web material and the outer surface of the roll can be obtained. In many cases, the roll provides not only a temperature treatment but also a mechanical treatment, such as for example a pressing treatment. Regardless of the fact that the last-mentioned treatment is performed or not, it is important that in all cases the roller has a constant diameter over its entire length. This is also true when the roll because of its great length which often lies between 5 and 10 meters is flexed and supported or compensated in another manner. When such a hollow shaft is continuously surrounded only on its smaller part by a web material to be heated or cooled, the heat tranfer between the web material and the outer surface of the roll is different in this part as compared with end parts not covered by the web material, since in the end parts heat transfer between the surrounding air and the outer surface of the roll takes place. Therefore, the temperature of the roll over its length is not constant. As a result of this, because of different thermal expansions, the roll diameter in the end region changes as compared with the central part in contact with the web material. This leads, for example in heated rolls for calendaring of paper, to the fact that the edge of the paper web is thinner than the central region, which is extremely undesirable.

SUMMARY OF THE INVENTION

Accordingly, it is an object of the present invention to provide an arrangement for manufacturing or treating a web material, which avoids the disadvantages of the prior art.

More particularly, it is an object of the present invention to provide an arrangement for manufacturing or treating a web material in which deviations of the diameter of the end regions of the roll relative to the central regions of the roll, resulting from stronger heat withdrawal in heated rolls or stronger heating in cooled rolls in the central region of the roll, are completely or partially compensated, or in some cases overcompensated.

The influence of a diameter in accordance with the present invention is naturally limited. It is limited for steel or cast iron rolls, in the machines in accordance with the present invention when the rolls as a rule are composed of steel or cast iron, particularly a chill casting, to several pars per mile. This is completely sufficient, inasmuch as normally the compensation of expansions lies in this value range.

In keeping with these objects, and with others such will become apparent hereinafter, one feature of the present invention resides, briefly stated, in an arrangement for manufacturing or treating a web material which has a hollow roll with a jacket, bearing pins each supporting an end region of the jacket and having a passage for a heat-carrying fluid, and a displacement member located inside the jacket and extending substantially over the entire length thereof, wherein heat-insulating means is provided at an inner side of each of the end regions of the jacket for reducing the heat transfer from the heat-carrying fluid to the jacket.

When the arrangement is designed in accordance with these features, in the inwardly heated roll in which in the central region more heat is taken from outside than in the end regions since this central region is surrounded by the web material to be heated, the temperature of the central region of the roll jacket is not lower than in the end region, inasmuch as heating at the end regions is throttled. As a result of this, a greater thermal expansion in the end regions as compared with the central region is prevented. The diameter of the roller remains constant. The gap between the roll and a counterroll composed of the same or softer or harder material can also be maintained constant over its entire length.

In accordance with another advantageous feature of the present invention, the heating-insulating means can be formed as a ring of heat-insulating material. For example, a synthetic plastic material such as polytetrafluoroethylene or rubber can be used for the ring. In certain conditions, also a metal ring can be provided. In this case, the metal ring must naturally be composed of an alloy with a low thermal conductivity. The rigid ring body can be formed, for example, as a hollow ring of sheet material with air inside.

Still another feature of the present invention is that the heat-insulating means is formed as a hollow member filled with the heat-carrying fluid. In this case, naturally, it must be taken care that no heat-carrying fluid exchange with the heated or cooled heat-carrying fluid takes place, or such an exchange takes place in a sufficiently small quantity. Heat-insulating means must not be a closed hollow body, for example of sheet material.

In accordance with a further advantageous feature of the present invention the roll in which a casing of the displacement member abuts against a flange of the bearing pin and the heat carrier flows in an intermediate chamber between the end wall of the displacement member and the flange of the pin through openings in the casing of the displacement member into the annular gap, or vice versa, has the heat exchanging means which is formed or held by a ring blocking the end region of the casing of the displacement member or a respective end region of the annular gap.

In the simplest case, in which the exact manufacture in respect to sealing need not be of great value, the heat-insulating means is formed by the heat-carrying fluid, such as for example water, which accumulates in a dead chamber between the casing of the displacement member, the flange of the pin, the jacket of the wall and the ring. This chamber can be filled with a solid insulating member, for example of polytetrafluoroethylene or rubber or another heat-insulating material at temperatures which prevail there, for example in the range of 100° C. Thus, the normal ring-shaped heat-insulating means can be composed of an air-filled metal pipe having a plurality of coils, which can otherwise be filled with water, or of a chamber filled with solid insulating material.

It is also possible to shrink in or to glue in a solid heat-insulating means, for example simply in the respective end of the roll jacket, prior to screwing of the flanges which carry the pins in the roll jacket. During shrinking in of a synthetic plastic ring, it must be taken care that it will seat sufficiently firmly during working temperatures. In this sense it is sufficient to provide a slight arresting in axial direction, for example by a respective shoulder or conical surface extending normal to the roll axis or inclined to the latter.

When it is considered that the heat-insulating means is not sufficient for insulating the end region of the roll, since through the central heat carrier passage it extends through the pins and the flange, too much heat flows in the end regions of the roll jacket, in accordance with still a further feature of the present invention the heat carrier conduit can be heat-insulated from the pins. While these features are advantageously used in connection with the above-described features of the present invention, they also can be used independently from the latter. In many cases, such an insulation can be sufficient to protect the end regions of the roll against excessive thermal expansion or, in rolls with cooling medium, against excessive thermal contraction.

In accordance with a further advantageous feature of the present invention, the insulation of the heat carrier passage in the pins relative to the latter is performed by an annular gap which surrounds the passage. This annular gap can be filled with air. It also can be filled with a heat-carrying fluid. Finally, it also can be filled with a solid heat-insulating material. When a solid heat-insulating material is used, the passage can be lined inwardly with this material.

Yet another advantageous feature of the present invention is that the inner end surfaces of the flanges are thermally insulated from the interior of the roll. In this way, the heat flow from the heat carrier in the flange and out of the flange in the roll jacket is further reduced. When these features are generally utilized in connection with the heat insulation of the inner side of the roll jacket on the roll jacket ends and the heat insulation of the heat carrier passage in the interior of the pins, they can also be used without these latter mentioned features, and in many cases provide for sufficient results.

Whether the above-mentioned three features are used singly or in combinations of two or three depends upon how great is the difference between the roll outer diameter in the end regions and in the central region surrounded by the web material to be comprised, or in other words how high is the temperature difference between the central region and the end regions of the roll.

The heat insulation at the inner surfaces of the flanges facing toward the interior of the roll can be formed as an annular gap which can be filled with air or heat carrier. The heat insulation can also be provided by a solid heat-insulating element which abuts against the respective end sides of the flanges.

Also in connection with the previously described heat-insulating features, but independently of the heat-insulating means at the inner side of the roll jacket and at the flange-like end regions of the casing of the displacement member, the desired reduction of the temperature at the ends of the roll can be provided by openings in the casing of the displacement member close to the end wall of the latter and at a considerable distance from the respective flange. In this case, in flange-side region of the drum-shaped hollow chamber through which the heat carrier fluid flows from the supply passage in the pin into the annular gap surrounding the displacement member, a dead chamber is formed in which non-rotating or only slightly rotating heat-carrying fluid insulates the roll end against undesirable heating or cooling.

Finally, in accordance with still a further feature of the present invention, a heat-insulating layer can be arranged between the flange and the roll jacket in connecting region. The heat-insulating layer can be composed for example of a ferro-alloy with low thermal conductivity. In other words, an intermediate disk of an appropriate alloy is inserted herein. These features can be used in connection with the above-mentioned features, and also without these features. This is especially true when the centering region of the flange inwardly lying on the roll jacket is surrounded outwardly with a jacket of sufficiently solid metal with low thermal conductivity. These features are especially advantageous in connection with, or instead of, a coating of the heat carrier passage in the pins and a coating of the end surfaces of the flanges facing toward the interior of the roll with an insulating material.

The novel features which are considered characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIGS. 5 and 6 are views substantially similar to FIGS. 3 and 4, but showing two further embodiments of the invention.

DESCRIPTION OF THE PREFERRED EMBODIMENTS

Figure 1:
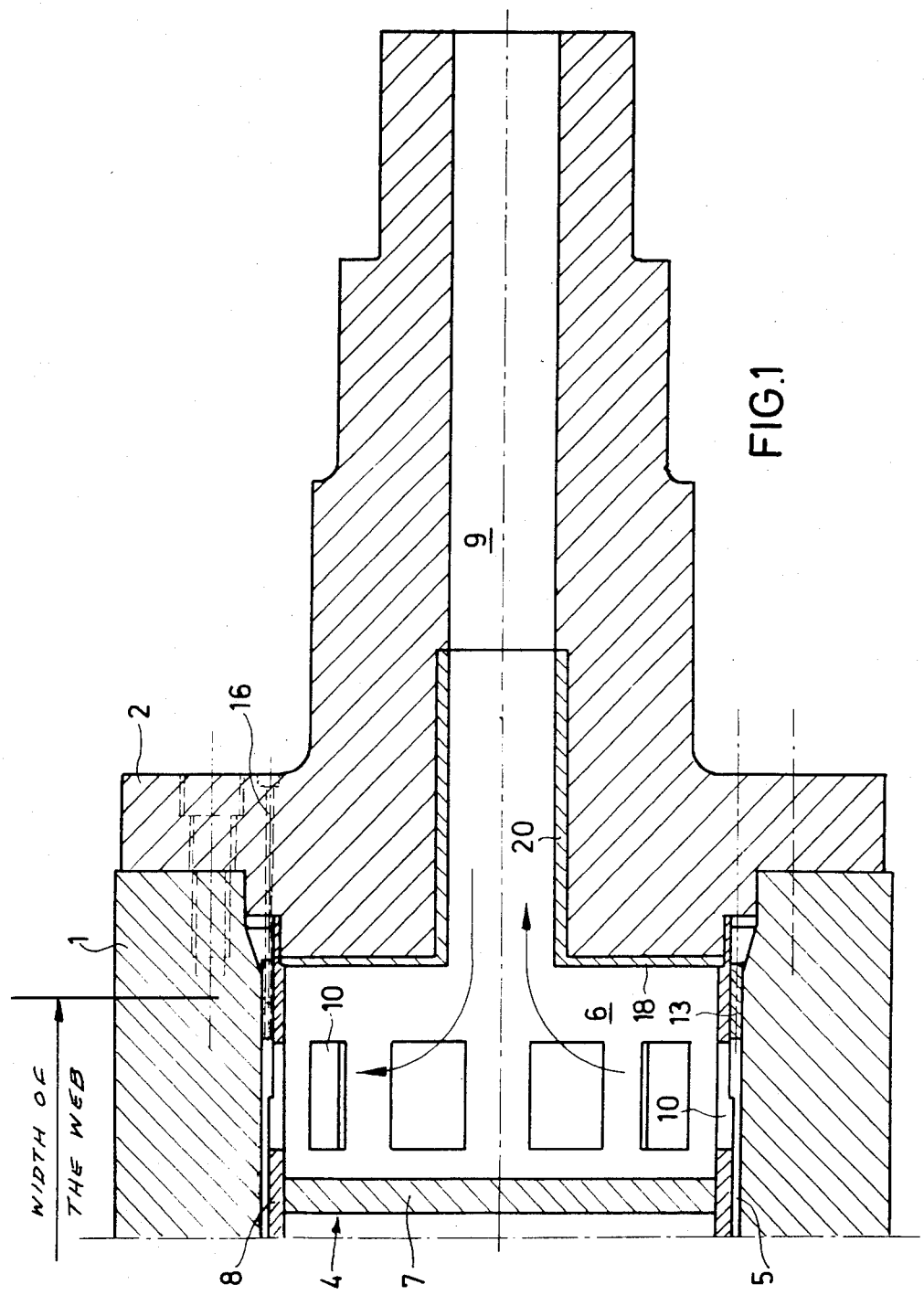
FIG. 1 is a view showing an axial section of an end of a roller in accordance with the present invention.

FIG. 1 shows a calender roll in accordance with the present invention. A calender roll substantially has a roll jacket which is identified with reference numeral 1 and composed of chilled casting, pins 3 arranged at both ends of the roll jacket 1 and supporting the latter with the aid of flanges 2 formed of one piece with the pins, and a displacement body 4 located in a hollow chamber between the flanges 2 and the roll jacket 1 so as to fill this chamber with formation of a small annular gap 5. The displacement body 4 forms at both its ends a substantially drum-shaped flow chamber 6 between the flanges 2 and an end wall 7 of the displacement body.

As in all illustrated embodiments of the invention, in the construction shown in FIG. 1 the flange 2 is screwed in a conventional way to the respective end wall of the roll jacket 1 and centered in a recess at the end of the latter with the aid of a respective projection.

The displacement body 4 is composed of a thin sheet cylindrical casing 8 having dimensions corresponding to the dimensions of the roll jacket 1. The casing 8 of the displacement body is centered with both its ends, as shown in the drawing, on a respective projection of the flange 2. In axial direction, the casing 8 of the displacement member abuts with an amount of play practically required against the end faces of the flange 2. The casing 8 is welded with two round sheet disks 7 which form end walls of the displacement member.

The disks 7 have such a distance from a left end face of the flange 2, in FIG. 1, that the above-mentioned drum-shaped flow chamber 6 is freely formed between the flange and this end face.

The upper arrow in FIG. 1 shows flowing in of the heat-carrying fluid, usually water, whereas the lower arrow shows the flow at another roll end where the flow leaves the roller. For allowing the flow to displace from a central passage 9 of the pin 3 through the flow chamber 6 into the annular gap between the displacement member 4 and the roll jacket 1, the casing 8 of the displacement member is provided with windows 10 in the part thereof projecting beyond the disk 7. The heat-carrying fluid flows through the windows. The construction at another end of the roll is similar.

The width of the web to be treated with the roller in accordance with FIG. 1, for example a paper web, is shown above in FIG. 1 and identified as "web width". When during operation with the heated roller a continuous cooling of the roller periphery in the region of the web width takes place through the web to be treated, a roller end region located at the right side of the web width in FIG. 1 and a not shown roller end region located at the left side of the web width remain uncooled, so that it is heated more strongly, and thereby increases in diameter. For counteracting this effect, the windows 10 are provided in the projecting region of the casing 8 of the displacement member, axially at a distance from an end surface 11 of the flanges 2, on the one hand. Furthermore, in the region between the inner surface of the roll jacket 1 and the outer surface of the casing 8 of the displacement body, a heat-insulating ring 13 is provided between the windows 10, on the one hand, and the end surface 11, on the other hand.

The heat-insulating ring 13 has the shape of a cylinder ring. It fills a gap between the inner surface of the roller jacket 1 and the outer surface of the casing 8, which outer surface is turned in this region. The axial length of the heat-insulating ring substantially corresponds in the shown embodiment to two thirds of the roll jacket part which overlaps the web width at the shown roll end. The heat-insulating ring 13 is composed, for example, of a synthetic plastic material which is sufficiently resistant to heat and water, such as for example of polytetrafluoroethylene, which also has sufficient heat-insulating properties. Instead of this material, also other synthetic plastic materials can be used which are coated with polytetrafluoroethylene. It is important to select the material for the heat-insulating ring so that it will withstand the required thermal load and moreover have a considerably lower heat-conductive property than the chilled casting of the roll jacket.

The heat-insulating ring 13 is located in the gap 15 axially immovable. Therefore, the heat transfer from the heat-carrying fluid, braked by the heat-insulating ring 13, can be varied at the end of the roll jacket 1. For displacing the heat-insulating ring 13, several adjusting screws 16 are provided and uniformly distributed over the periphery. The adjusting screws 16 are supported in the flange 2 for example with the aid of spring rings 17 in a rotatable but axially immovable manner. A sealing ring 19 is provided for preventing escape of the fluid through the opening for the shaft of each of the adjusting screws 16. The adjusting screws 16 have cylindrical heads with inner hexagons and are screwed in respective threaded openings of the heat-insulating ring.

Figure 2:
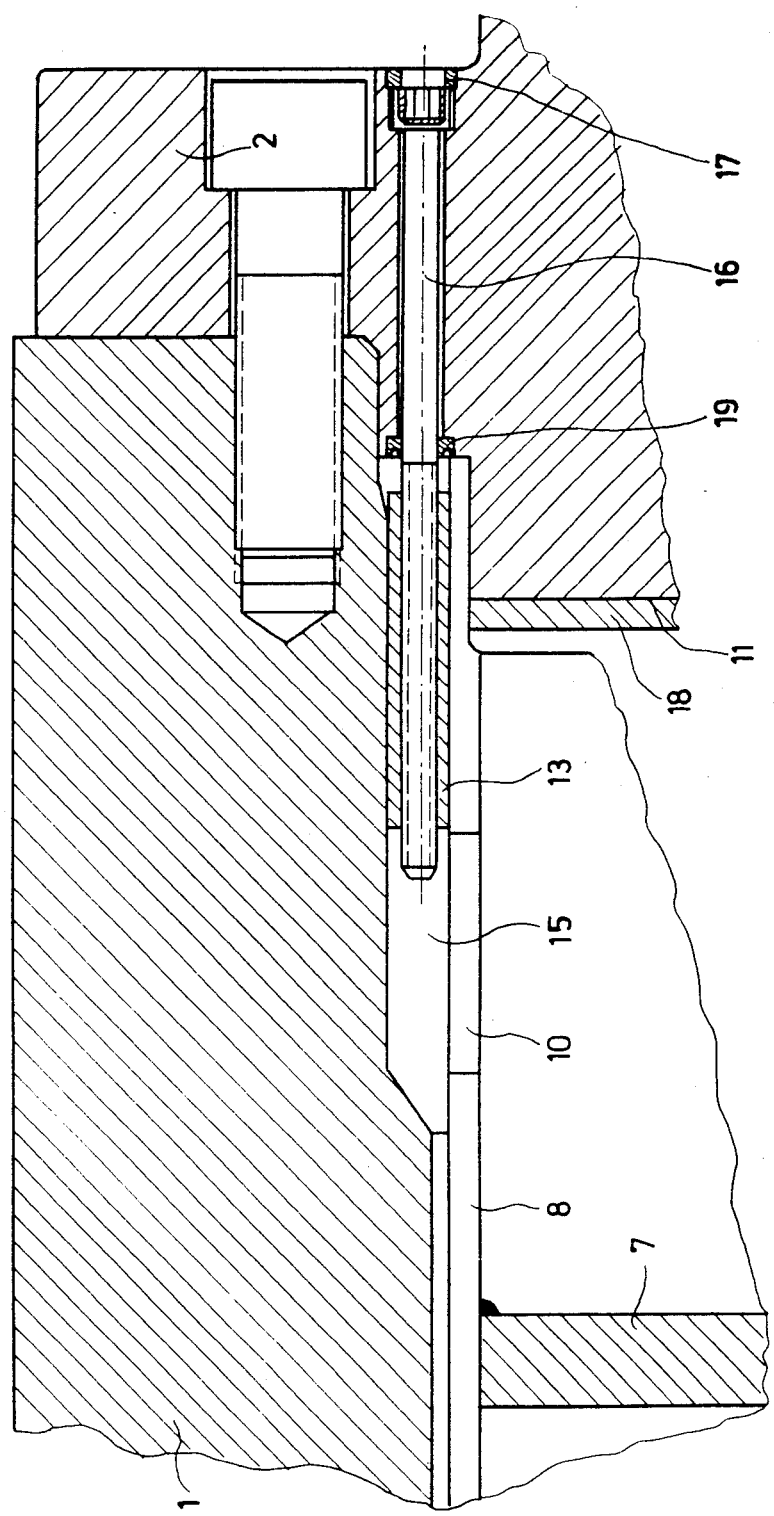
FIG. 2 is a view showing a portion of the roll of FIG. 1 on an enlarged scale and particularly an end of a roll jacket with a flange carrying the latter and a heat-insulating ring.

When the screws 17 are rotated, the heat-insulating ring 13 is displaced. The heat-insulating ring 13 in its extreme right position shown in FIGS. 1 and 2 provides for the lowest heat-insulating action. When it is displaced to the left, the heat-insulating action increases, inasmuch as the portion of the roll jacket inner surface bridged by the ring increases to the left, whereas the hollow chamber which is at the right from the heat-insulating ring 13 in FIGS. 1 and 3 also increases and thereby continuously provides a heat-insulating action. This heat-insulating action is substantially dependent upon whether the hollow chamber is filled or not with the heat-carrying fluid, inasmuch as the heat-carrying fluid located therein has a considerably inferior heat-conductive property than the metal of the surrounding parts.

As can be seen particularly clearly from FIG. 1, there is a possibility that considerable heat transfer takes place from the passage 9 and the drum-shaped flow chamber 6 through the respective outer surfaces of the pins 3 and the flange 2 to the flange and from it to the roll jacket 1. For counteracting this effect, in the embodiment shown in FIGS. 1 and 2 the surface 11 of the flange 2, which surface faces toward the flow chamber 6, is coated with a plate 18 of a heat-insulating material, for example an appropriate synthetic plastic material. The plate 18 can be, for example, screwed or glued to the flange 2. In this manner, the heat flow from the chamber 6 is considerably braked in the flange. Coating of the flow passage 9 with a sleeve 20 of a heat-insulating material, as shown in FIG. 1, provides the same results. The sleeve 20 is inserted in a respective recess of the pin 3 in the region of the flange 2 and secured there, for example with the aid of a pin, against axial displacement.

As can be seen from FIG. 1, the end region of the roll jacket 1, the end surface of the flange 2 facing toward the flow, and the interior of the flow passage 9 in the region of the flange 2 are coated with a respective heat-insulating layer, so that the heat flow from the heat-carrying fluid in the region outside the jacket's central region covered by the web meets a very high resistance. In dependence upon requirements, one or another of the illustrated heat-insulating means can be dispensed with, when the heat action available from the construction of FIG. 1 is too great.

Figure 3:
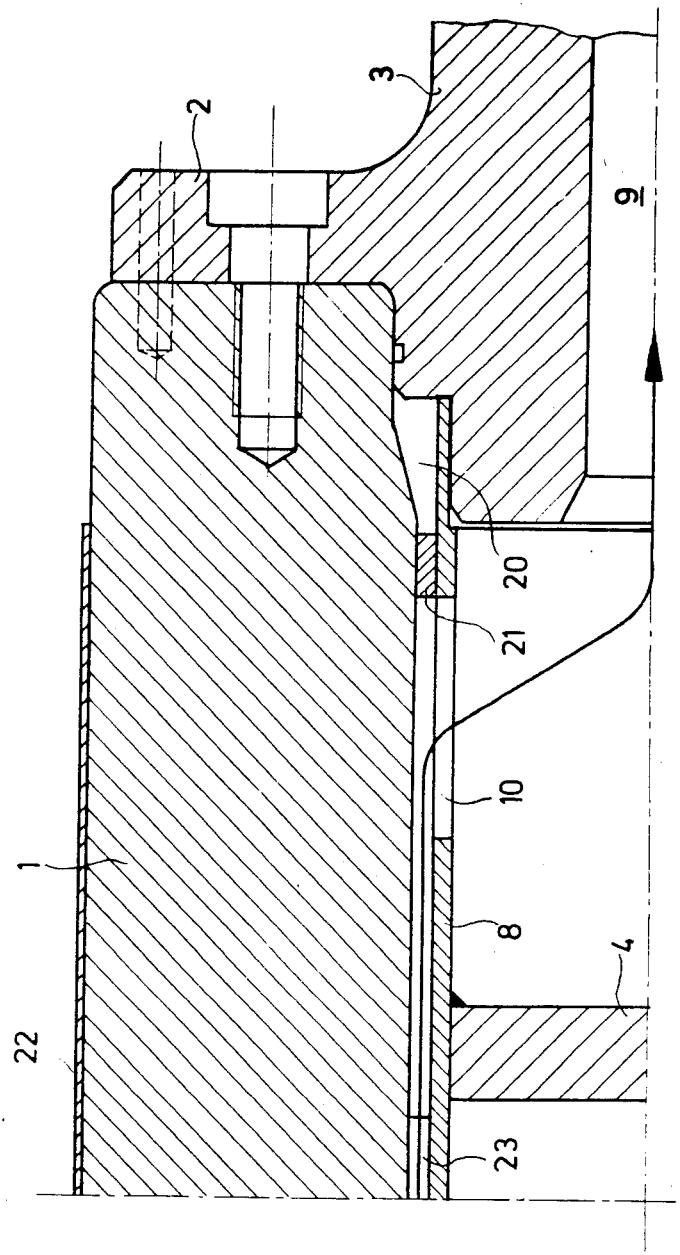
FIG. 3 is a view showing an axial section of a roll in accordance with another embodiment of the invention, in which only one half of one end of the roll is shown.

The roller shown in FIG. 3 substantially corresponds to the roller of FIGS. 1 and 2 in the design of the roller itself and in the displacement member. Identical parts are identified by the same reference numerals. The description of FIG. 1 substantially applies to the construction of FIG. 3. In contrast to the construction shown in FIG. 1, however, in the construction shown in FIG. 3 only one heat-insulating body is provided. This heat-insulating body consists substantially of a heat-carrying fluid located in a dead chamber 20 between the roller jacket 1, the left end surface of the flange 2, the outer periphery of the casing 8 of the displacement body and a locking ring 21.

The ring 21 is formed, for example, as a steel ring which is welded on the casing 8 in the region of the edge of the window 10, which edge is adjacent to the pin 3. The ring 21 can also be formed of an insulating material, such as for example an approrpriate synthetic plastic material or temperature-resistant rubber. The ring need not necessarily provide sealing relative to the outer surface of the roll jacket 1. A small circulation of the heat-carrying fluid between the heat-carrying stream and the heat-carrying quantity in the dead chamber 20 plays practically no role.

The construction of FIG. 3 is designed and provides for a considerably lower heat insulation than the construction in FIG. 1. This construction is first of all utilized, as shown in FIG. 3, when in the heated roll the heat losses of the roll outer surface by radiation and convection in the end region of the roll which is not surrounded by the web material are not considerably smaller than the heat losses by radiation, convection and heat received by the web material in the roll region surrounded by the web material. The web material is identified in FIG. 3 with reference numeral 22.

In all the above-described construcstions, the displacement member 4 is supported inside the roll jacket in a radial direction in a known manner by welded axially extending fins. Such a fin is shown in FIG. 3 and identified with reference numeral 23.

Figure 4:
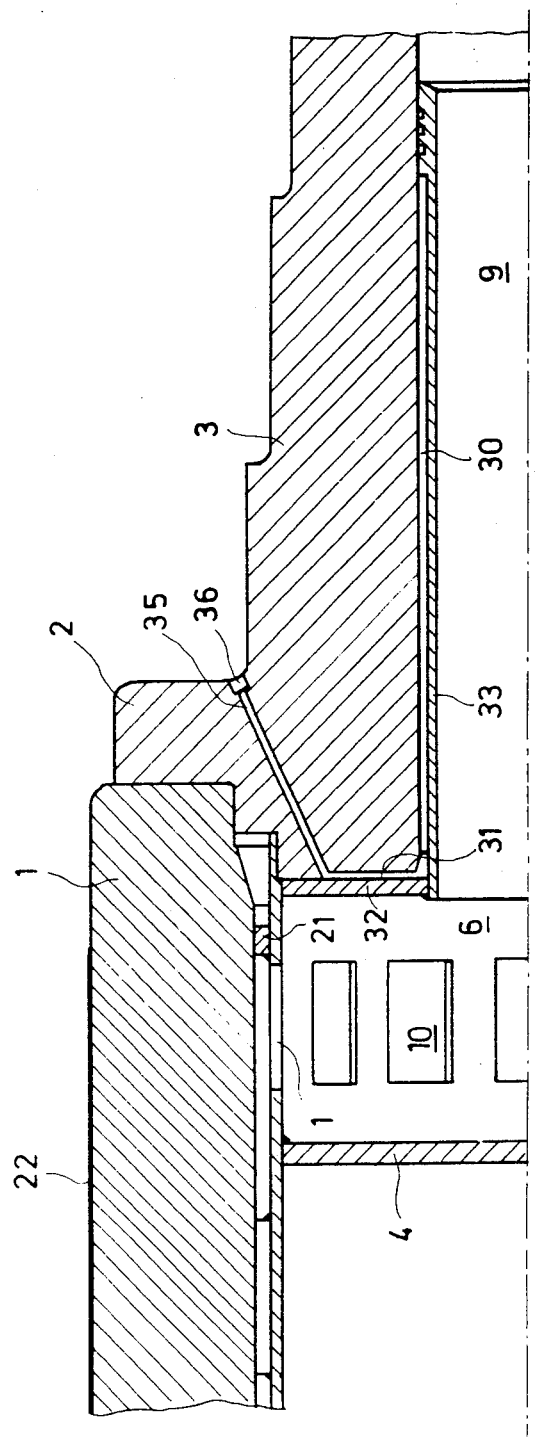
FIG. 4 is a view substantially corresponding to the view of FIG. 3, but showing a roll in accordance with a further embodiment of the invention.

In the construction shown in FIG. 4, the roller jacket 1, the flange 2, the pins 3, and the displacement body 4 substantially correspond to the respective parts of the previously described constructions. The heat insulation of the end regions of the roll relative to the drum-shaped flow chamber 6 is carried out here similarly to the construction in FIG. 3. Here also the dead chamber 20, filled with the fluid, is provided which is locked from the flow chamber by the ring 21. In this construction as well as in the construction of FIG. 3, the chamber 20 can be filled with another material, for example with a loose insulating material, which further reduces the heat transfer.

In contrast to the above-described constructions, in the roll in accordance with the construction of FIG. 4 the flow passage 9 is thermally insulated from the pin 3 by an air gap 30. The air gap 30 need not extend over the entire length of the pin. It suffices that the regions of the pin 3 which are close to the flange be insulated by such an air gap. The end wall of the flange 2, which faces toward the flow chamber 6, is also insulated with an air gap 31. The air gap 31 is covered from the flow chamber 6 by a plate 32, for example of steel. This plate can be welded with a pipe 33 which forms in the air gap 30 a wall facing toward the flow passage 9.

It can be understood that this construction provides for considerable heat insulation of pin and flange from the heat-carrying fluid. Thereby, here a heat flow from the flange in the chill casting roll jacket 1 is reduced very effectively. The annular gap 30 and the gap 31 need not be filled with air. They can instead be filled with a fluid which is thermally insulating. In many cases it suffices to fill these gaps with the heat-carrying fluid. To make possible filling with respective materials, the gap 31, which communicates with the annular gap 30, is connected with an opening 35 through which respective fluid (liquid) material can be supplied or withdrawn. The opening is closed for example by a plug 36.

An especially simple embodiment of the present invention is schematically shown in FIG. 5. The roll shown in this Figure has a roll jacket 1, a flange 2 of the pin 3 which carries the roll jacket 1, and a cylindrical welded displacement body 40 which is formed as a hollow sheet steel cylinder. The displacement body 40 is centered relative to the inner wall of the roll jacket 1 with the aid of sheet fins 41 which are welded on the displacement member 40. Spacer rods 42 serve for fixing in an axial direction. The spacer rods 42 abut against the flange 2 at each end of the roll. The fluid flow takes place here also through the central flow passage 9 in the pin 3, the drum-shaped hollow chamber 6 between the flange 2 and the respective end wall of the displacement member 4, and the annular gap 5 between the displacement member and the roll jacket 1.

In accordance with the present invention, the heat insulation is carried out here by a ring 44 of a heat-insulating material which is inserted advantageously with prestress in the end of the roll jacket 1. The ring has a simple form of a cylinder ring. It is composed, for example, of a heat-resistant rubber which is glued in the roll jacket. When the ring is loose, the prestress can be dispensed with. When the ring is composed of a hard synthetic plastic material, the gluing can be dispensed with and the ring can be held by a prestress. The ring can be fixed in axial direction, for example by respective projections which abut against the end wall of the displacement member.

In the construction shown in FIG. 6 the roll jacket 1, the flange 2 and the pin 3 correspond to respective parts of the previous embodiments. A displacement member 50 has substantially the same design as the displacement 4 of the constructions of FIGS. 1-4. It differs from the displacement member 4 of the above-mentioned constructions in that the window 10 through which the flow runs from the drum-shaped flow chamber 6 in the annular gap 5 is displaced farther from the flange 2 and closer to the respective end wall of the displacement member 50. Thereby a dead region 51 is formed between the flange 2 and the projecting portion of the casing of the displacement member at the flange side. In the dead region 51, the heat-carrying fluid is not continuously replaced by newly flowing in heat-carrying fluid. Thereby the heat-carrying fluid in this region, as well as in a chamber 52 which is only ineffectively available for heat-carrying fluid exchange, serves as insulation for the outer edge of the roll jacket.

The insulating action can be increased when, as shown in broken lines in FIG. 6, a sheet ring 54 is provided which further considerably reduces the fluid exchange in the chamber 51 with the flowing heat-carrying fluid. In the same manner, the chamber 52 can be additionally locked from the region of the annular gap 50, which region is located at the left side of the chamber 52. It will be understood from the above-presented examples that not only the above-shown possibilities exist. It is possible to combine the above-described different insulating features. For example, the construction of FIG. 6 can be combined with the constructions of other examples. In the construction of FIG. 5, the heat insulation 11 and 20 of FIG. 1 can be provided, and more of the same. In all shown examples, the left roll end, which is not shown in the drawings, is formed identical to the right roll end.

It will be understood that each of the elements described above, or two or more together, may also find a useful application in other types of constructions differing from the types described above.

While the invention has been illustrated and described as embodied in an arrangement for manufacturing or treating a web material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An arrangement for manufacturing or treating a web material, such as a paper machine or a coating machine, comprising a rotary hollow roll having a hollow jacket which has an axis, a central region around which a web material moves, and two axial end regions which are free from the web material; two bearing pins each supporting said jacket in a respective one of said end regions, at least one of said bearing pins having a passage for a heat-carrying fluid; a displacement member located inside said jacket and extending concentrically to said jacket so as to form an annular gap between said displacement member and said jacket and communicating with said passage for a heat-carrying fluid to supply the latter, said displacing member having end walls and a casing with openings and a flange-like end portion, each of said bearing pins having a flange against which said casing of said displacing member abuts and through which said passage also extends, said end walls of said displacing member and said flanges of said bearing pins forming an intermediate chamber therebetween so that the heat-carrying fluid flows from said pin into said intermediate chamber and then in said annular gap through said openings, or vice versa; and heat-insulating means arranged at an inner side of each of said end regions of said jacket and operative for reducing heat transfer from the heat-carrying fluid to said jacket, said heat-insulating means including a ring which blocks a respective one of said end portions of said casing of said displacement member and thereby a respective end portion of said annular gap.

2. An arrangement as defined in claim 1, wherein said passage of said one bearing pin is arranged for supplying the heat-carrying fluid.

3. An arrangement as defined in claim 1, wherein said passage of said one bearing pin is arranged for withdrawing the heat-carrying fluid.

4. An arrangement as defined in claim 1; and further comprising guiding elements arranged in said passage for guiding the heat-carrying fluid.

5. An arrangement as defined in claim 1; and further comprising supporting elements arranged in said passage for supporting said displacement member.

6. An arrangement as defined in claim 1; and further comprising means for controlling throughput of the heat-carrying fluid supplied through said passage.

7. An arrangement as defined in claim 1; and further comprising means for controlling temperature of the heat-carrying fluid supplied through said passage.

8. An arrangement as defined in claim 1, wherein said ring is composed of a heat-insulating material.

9. An arrangement as defined in claim 1, wherein said heat-insulating means includes a hollow member which is filled with heat-carrying fluid.

10. An arrangement as defined in claim 1, wherein said insulating means is formed as said ring.

11. An arrangement as defined in claim 1, wherein said insulating means is held by said ring.

12. An arrangement as defined in claim 1, wherein said heat-insulating means is displaceable in an axial direction.

13. An arrangement for manufacturing or treating a web material, such as a paper machine or a coating machine, comprising a rotary hollow roll having a hollow jacket which has an axis, a central region around which a web material moves, and two axial end regions which are free from the web material; two bearing pins each supporting said jacket in a respective one of said end regions, at least one of said bearing pins having a passage for a heat-carrying fluid; a displacement member located inside said jacket and extending concentrically to said jacket so as to form an annular gap between said displacement member and said jacket and communicating with said passage for a heat-carrying fluid to supply the latter; and heat-insulating means arranged at an inner side of each of said end regions of said jacket and operative for reducing heat transfer from the heat-carrying fluid to said jacket, said heat-insulating means including a hollow member which is filled with heat-carrying fluid.

* * * * *